(No Model.)
F. SEDGLEY.
INSTRUMENT FOR SAMPLING OR GAGING THE DEPTH OF LIQUIDS IN TANKS, VATS, OR OTHER VESSELS.
No. 455,122. Patented June 30, 1891.
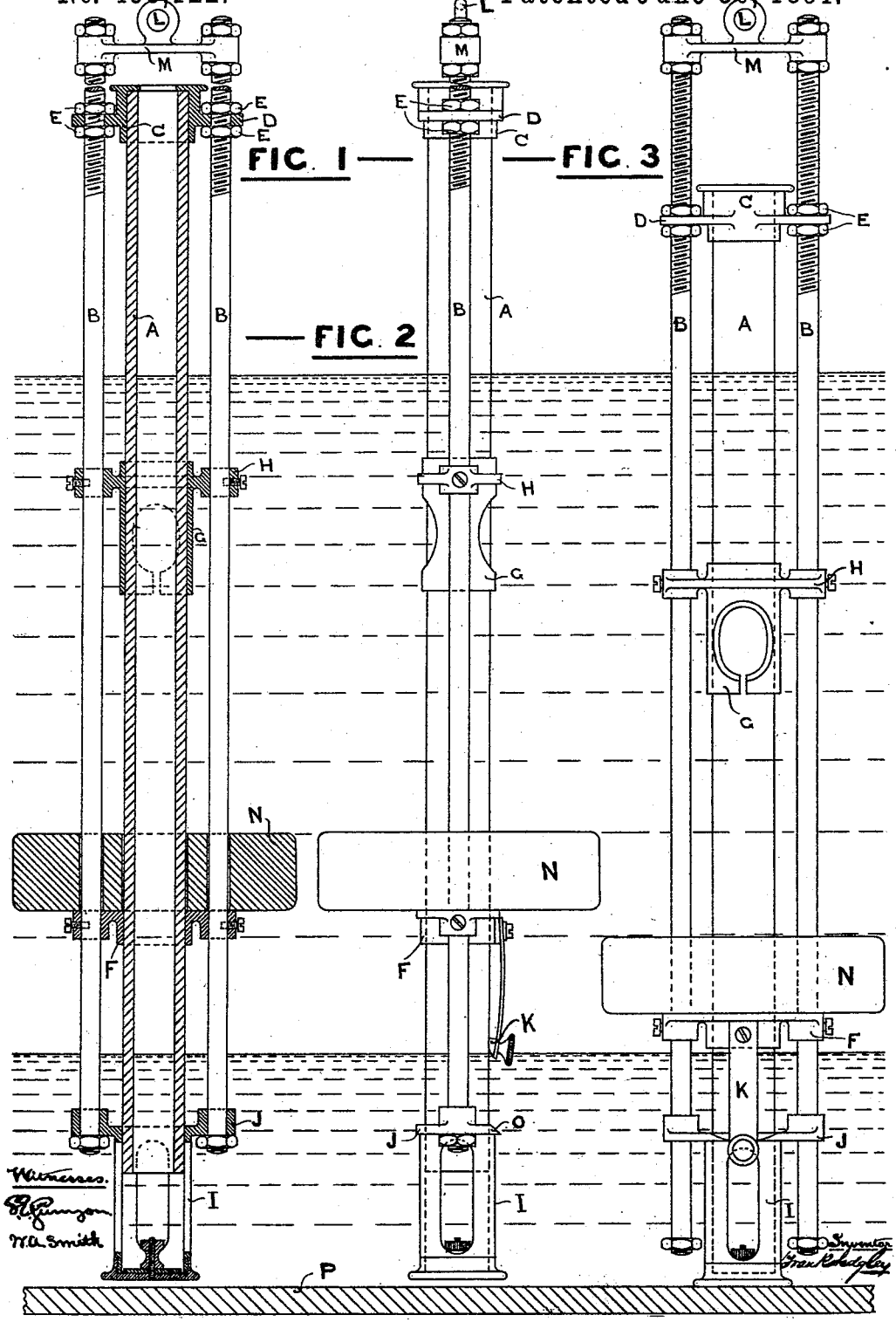

UNITED STATES PATENT OFFICE.

FRANK SEDGLEY, OF LONDON, ENGLAND.

INSTRUMENT FOR SAMPLING OR GAGING THE DEPTH OF LIQUIDS IN TANKS, VATS, OR OTHER VESSELS.

SPECIFICATION forming part of Letters Patent No. 455,122, dated June 30, 1891.

Application filed August 28, 1890. Serial No. 363,303. (No model.) Patented in England October 31, 1889, No. 17,275.

*To all whom it may concern:*

Be it known that I, FRANK SEDGLEY, inspector and gager of petroleum cargoes, a subject of the Queen of Great Britain, residing at 3 Bury Court, Saint Mary Axe, in the city of London and Kingdom of Great Britain, have invented an Improved Instrument for Sampling or Gaging the Depth of Liquids in Tanks, Vats, or other Vessels, (patented in Great Britain October 31, 1889, No. 17,275,) of which the following is a specification.

This invention relates to an improved instrument for obtaining samples or for ascertaining the nature and depth of the liquid contained in the lower part of a tank or other receptacle, such as a petroleum-tank, for example.

It is well known in the petroleum trade that tanks for transporting or storing that liquid often contain more or less water or sediment, which, being heavier than the petroleum, "settles out" or separates therefrom and remains at the bottom of the vessel, and it is often required to ascertain what is the exact depth of the water or sediment at the bottom of such tank, in order that the superincumbent quantity of petroleum may be accurately measured or calculated. Instruments for this or analogous purposes have already been devised consisting of a glass tube having a valve at the bottom opening upward. This glass tube is let down in the liquid to any point from which it is desired to take a sample. The valve opens as the instrument descends, or as soon as it reaches the bottom, so as to allow the liquid to pass up into the glass tube, and when the latter is drawn up the valve closes, so as to retain the sample of liquid therein. When this instrument as heretofore constructed is used for ascertaining the nature and depth of the lower stratum of liquid in a given tank or other vessel, its indication is not always reliable, and when the depth of the lower stratum is comparatively small it is sometimes not indicated at all, because the valve, being arranged to open upward, must necessarily be placed at some little distance above the lower end of the tube, and consequently if the depth of the lower stratum of liquid is less than that from the top of the valve to the lower end of the tube no portion of that liquid enters the latter and no indication of its presence is given.

The object of my invention is to produce an instrument of this class which shall be capable of indicating the nature and depth of the lower stratum of liquid in a tank or other vessel, even when the depth of that stratum is very small, indeed, which is a matter of considerable importance in the case of large receptacles—such as petroleum-tanks, for example—where every quarter of an inch of depth may amount to a considerable number of gallons, or even tons, of liquid.

My improved instrument consists of a glass tube open at top and bottom, but provided with a valve adapted to close against the lower end of the said tube. This valve is so arranged that it depends below the lower end of the glass tube and remains open while the instrument is descending through the liquid until it (the valve) reaches the bottom of the tank or other receptacle, when its progess is arrested and the glass tube, which is suitably weighted, continues its downward movement until its lower end comes in contact with the valve. A spring-catch retains the latter closed against the end of the tube, and the instrument may then be drawn up and the depth of the lower stratum of liquid contained in it (which liquid will be visible through the glass tube) can be measured or read off by means of a suitable scale. I prefer to mount the glass tube in a metallic frame easily adjusted as to length, so that a longer or shorter glass tube can be placed and secured therein, as may be required.

By arranging the valve in the manner above described it may be made very thin, so that the presence of a stratum of liquid of comparatively small depth can be indicated by the instrument, and the indications of the latter for all depths of liquid within its range are more accurate than in instruments of this class as usually constructed; and in order that the invention may be fully understood I will now proceed to describe the same, with the aid of the accompanying drawings, in which—

Figure 1 is a front elevation, partly in section, of one of my improved instruments, with the valve shown open, as it would be during the descent of the instrument through the liquid, of which two levels are shown, the upper one being the petroleum-level and the lower one the water-level, for example. Fig. 2 is a side elevation of the instrument, and Fig. 3 a partial front elevation showing the valve closed, as it would be when the instrument reaches the bottom of the tank or other vessel.

A is the glass tube open at top and bottom and secured in the metallic frame B D F M, the upper end being held in the perforated cap C, carried by the cross-bar D, which can be adjusted at various heights on the screwed side rods B, by means of the nuts E, to suit the length of tube A employed. The lower end of the tube A is guided by the cross-bar F, secured to the side rods B, while the tube is held in position and prevented from slipping downward in the frame B D F M by the spring-clip G, carried by the cross-bar H, also secured to the side rods B. This arrangement enables the glass tube A to be removed and replaced or renewed with great facility.

I is the valve mounted on a cross-bar J, the ends of which are guided and slide on the lower ends of the side rods B. The surface of the valve I, which closes against the lower end of the tube A, may be formed of leather or other suitable soft material that will make a liquid-tight joint with such tube.

K is a spring-catch which holds the valve in position when closed and prevents it from being opened by the weight of the column of liquid in the tube A when the instrument is drawn up out of the tank or other vessel.

It will now be understood that when the instrument, with the valve I open, as shown in Fig. 1, is lowered into a tank or other vessel containing liquid by means of a cord attached to the eye L of the upper cross-bar M, the valve I, being pendent below the tube A, reaches the bottom P of the tank or other vessel first, and the tube A is then carried down by the frame B D F M and the weight N, attached thereto, so that the lower end of the said tube A is brought into contact with the surface of the valve I, and the spring-catch K takes behind the stop or lug O and holds the valve in the closed position, as shown in Fig. 3. The instrument can then be drawn up, inclosing and retaining in the glass tube A a sample of so much of the stratum or strata of liquid or sediment at the bottom of the tank or other vessel as corresponds in depth to the height of the glass tube A.

I claim—

1. The improved instrument for sampling or gaging the depth of liquids, consisting of a glass tube A, open at top, a frame B D F M and spring-clip G for carrying and holding in position the said glass tube A, a valve I for closing the lower end of the tube A, the said valve being guided by the lower end of the said frame B D F M, and a spring K for holding the valve I closed against the lower end of the tube A when said valve and tube reach the bottom of the tank, all combined, arranged, and operating as hereinbefore described.

2. In instruments for sampling or gaging the depth of liquids, the devices for holding the glass tube in position and for guiding the valve at the lower end thereof, consisting of the adjustable metallic frame B D F M and the spring-clip G, as hereinbefore described, and illustrated in the drawings hereto annexed.

In testimony that I claim the foregoing as my invention I have signed my name in presence of two subscribing witnesses.

FRANK SEDGLEY.

Witnesses:
STEPHEN EDWARD GUNYON,
115 Cannon Street, London.
WILLIAM ANDERSON SMITH,
73 Sydner Road, London, N.